United States Patent
Preuss et al.

(10) Patent No.: US 7,797,156 B2
(45) Date of Patent: Sep. 14, 2010

(54) SPEECH ANALYZING SYSTEM WITH ADAPTIVE NOISE CODEBOOK

(75) Inventors: Robert David Preuss, Sagamore Beach, MA (US); Darren Ross Fabbri, Arlington, MA (US); Daniel Ramsay Cruthirds, Cambridge, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 793 days.

(21) Appl. No.: 11/355,777

(22) Filed: Feb. 15, 2006

(65) Prior Publication Data

US 2006/0184362 A1    Aug. 17, 2006

Related U.S. Application Data

(60) Provisional application No. 60/658,316, filed on Mar. 2, 2005, provisional application No. 60/652,931, filed on Feb. 15, 2005.

(51) Int. Cl.
*G10L 15/06* (2006.01)
*G10L 21/02* (2006.01)

(52) U.S. Cl. .............. 704/233; 704/243; 704/226; 704/227; 704/228; 704/244

(58) Field of Classification Search .............. 704/226, 704/227, 228, 233, 243, 244
See application file for complete search history.

(56) References Cited

U.S. PATENT DOCUMENTS

| | | | |
|---|---|---|---|
| 4,933,973 A * | 6/1990 | Porter | 704/233 |
| 5,001,758 A | 3/1991 | Galand et al. | |
| 5,680,508 A * | 10/1997 | Liu | 704/227 |
| 5,749,068 A | 5/1998 | Suzuki | |
| 5,778,342 A | 7/1998 | Erell et al. | |
| 5,924,065 A * | 7/1999 | Eberman et al. | 704/231 |
| 6,003,003 A * | 12/1999 | Asghar et al. | 704/243 |
| 6,381,569 B1 | 4/2002 | Sih et al. | |
| 6,427,135 B1 * | 7/2002 | Miseki et al. | 704/258 |
| 6,493,665 B1 * | 12/2002 | Su et al. | 704/230 |
| 6,732,070 B1 | 5/2004 | Rotola-Pukkila et al. | |
| 6,785,648 B2 | 8/2004 | Menendez-idal et al. | |
| 6,944,590 B2 | 9/2005 | Deng et al. | |
| 6,950,796 B2 | 9/2005 | Ma et al. | |
| 6,959,276 B2 | 10/2005 | Droppo et al. | |
| 7,260,520 B2 * | 8/2007 | Henn et al. | 704/212 |
| 7,260,527 B2 * | 8/2007 | Koshiba | 704/233 |
| 7,266,494 B2 * | 9/2007 | Droppo et al. | 704/228 |
| 7,315,815 B1 * | 1/2008 | Gersho et al. | 704/223 |

(Continued)

OTHER PUBLICATIONS

Collura John S., "Speech Enhancement and Coding in Harsh Acoustic Noise Environments." IEEE Speech Coding Workshop-99, Porvoo Finland.*

(Continued)

*Primary Examiner*—David R Hudspeth
*Assistant Examiner*—Edgar Guerra-Erazo
(74) *Attorney, Agent, or Firm*—Ropes & Gray LLP

(57) ABSTRACT

Presented herein are systems and methods for generating an adaptive noise codebook for use with electronic speech systems. The noise codebook includes a plurality of entries which may be updated based on environmental noise sounds. The speech system includes a speech codebook and the adaptive noise codebook. The system identifies speech sounds in an audio signal using the speech and noise codebooks.

76 Claims, 9 Drawing Sheets

U.S. PATENT DOCUMENTS

| | | | |
|---|---|---|---|
| 2001/0001141 | A1 | 5/2001 | Sih |
| 2002/0038210 | A1* | 3/2002 | Yajima et al. ............... 704/230 |
| 2003/0033143 | A1* | 2/2003 | Aronowitz ................. 704/233 |
| 2005/0080623 | A1 | 4/2005 | Furui et al. |

OTHER PUBLICATIONS

J. Collura and D. Rahikka. Interoperable Secure Voice Communications in Tactical Systems. IEE Colloq. on Speech Coding Algorithms for Radio Channels, 2000.*

Wang et al., "Stang 4591—the winner! A 1200/2400 BPS Coding Suite Based on MELP" (Mixed Escitation Linear Prediction) The Institute of Engineering & Technology, NC3A Workshop on Stanag 4591, The Hague, Powerpoint Presentation, pp. 1-17, Oct. 18, 2002.*

MELPe Vocoder Fact Sheet, Compandent Inc., Speech and Audio Compression Technologies, 2004.*

Street, M and Collura, J.: "Interoperable voice communications: test and selection of STANAG 4591", RTO-IST conf. on 'Military communications', Warsaw, Poland, 2001.*

Brady, et al. Multisensor MELPe using parameter substitution. Proc. Int. Conf. Acoustics, Speech, and Signal Processing, Montreal, Canada. 2004.

Srinivasan et al. Codebook-Based Bayesian Speech Enhancement. Proc. Int. Conf. Acoustics, Speech, and Signal Processing, Philadelphia, PA. 2005.

Chung Y-J: "Adaptation method using expectation-maximisation for noisy speech recognition" Electronics Letters, IEE Stevenage, GB, vol. 38, No. 13, pp. 666-667, Jun. 20, 2002.

McKinley B L., et al., "Noise model adaptation in model based speech enhancement" IEEE Internation al Conference on Acoustics, Speech, and Signal Processing—Proceedings. (ICASSP). , vol. 2. Conference 21, pp. 633-636, May 7, 1996.

Gong Y: "Speech recognition in noisy environments: A survey" Speech Communication, Elsevier Science Publishers, vol. 16, No. 3, pp. 261-291, Apr. 3, 1995.

Preuss, R., "Testing Spectral Hypotheses In Noise", Third ASSP Workshop on Spectrum Estimation and Modeling, IEEE, pp. 125-128, 1986.

Srinivasan, S., et al., "Speech Enhancement Using A-Priori Information With Classified Noise Codebooks", Proc. EUSIPCO, pp. 1461-1464, 2004.

Wang, T., et al., "A 1200 BPS Speech Coder Based on MELP", ICASSP Proc., pp. 1375-1378, 2000.

* cited by examiner

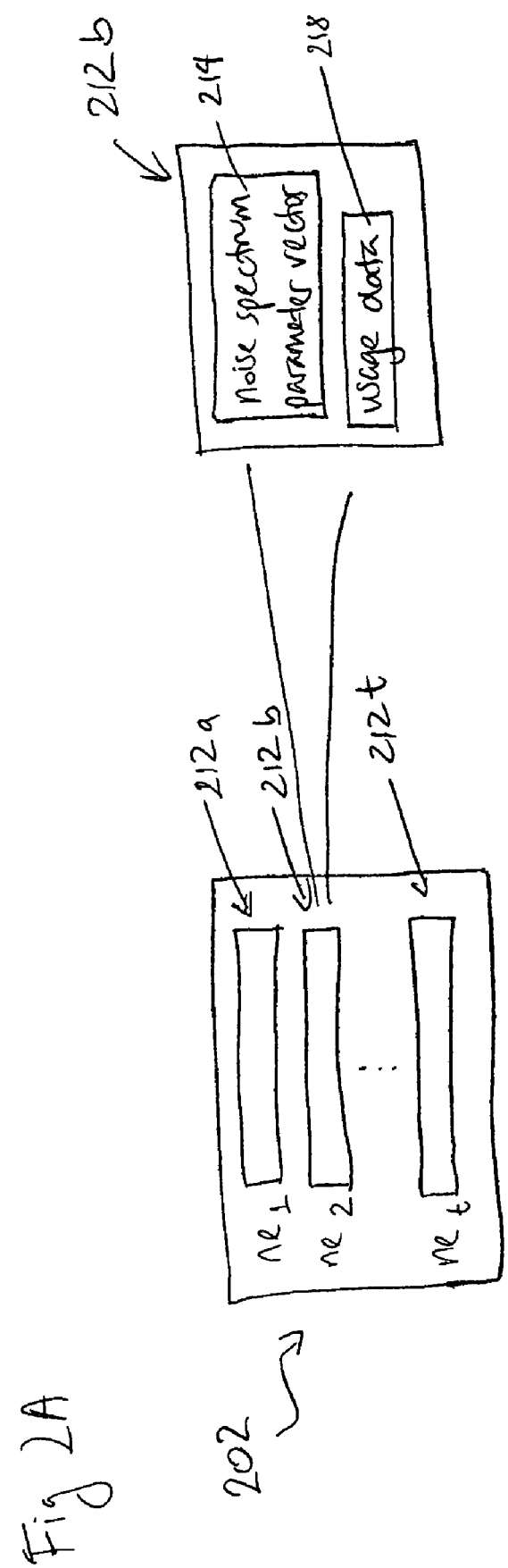

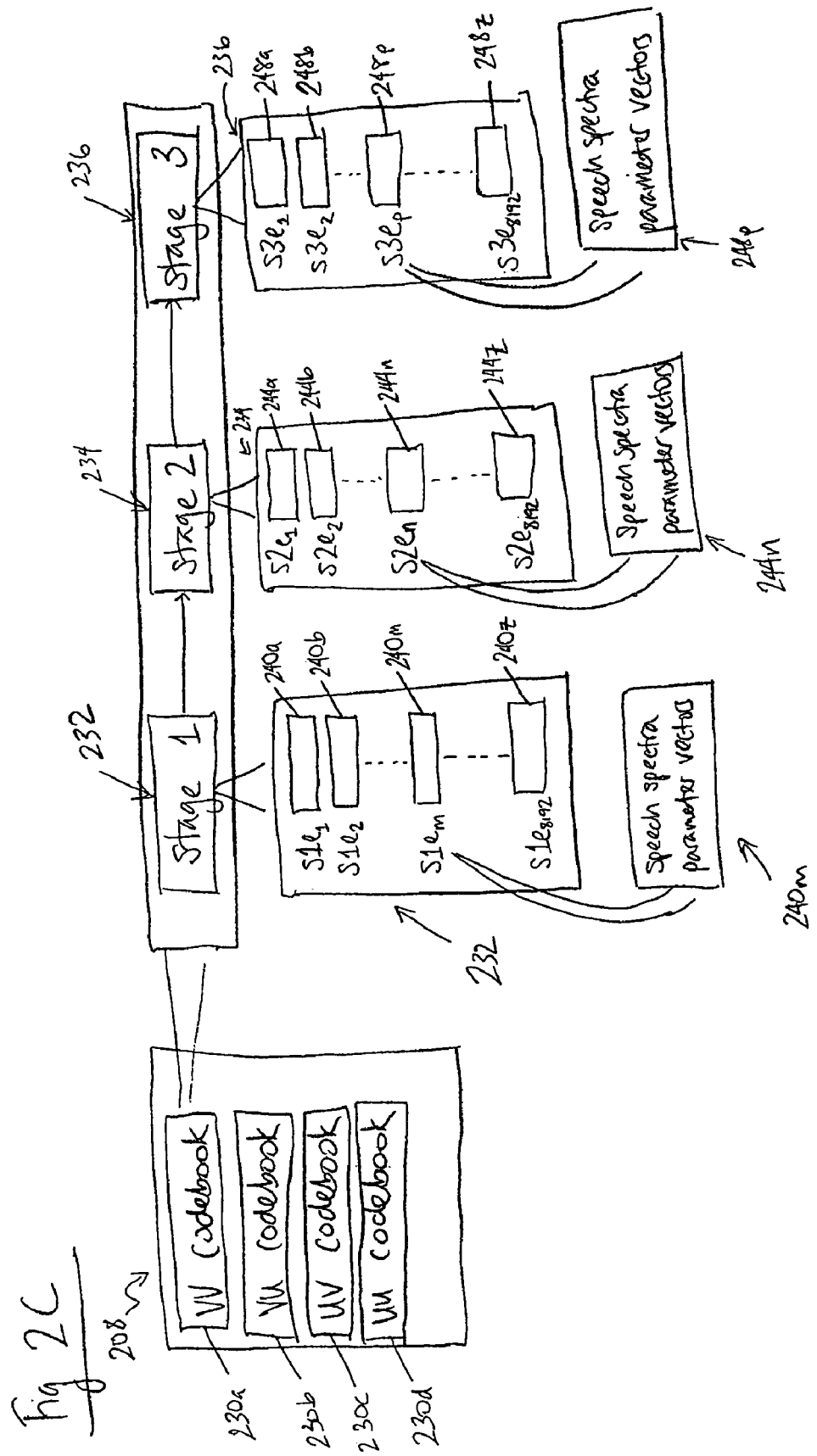

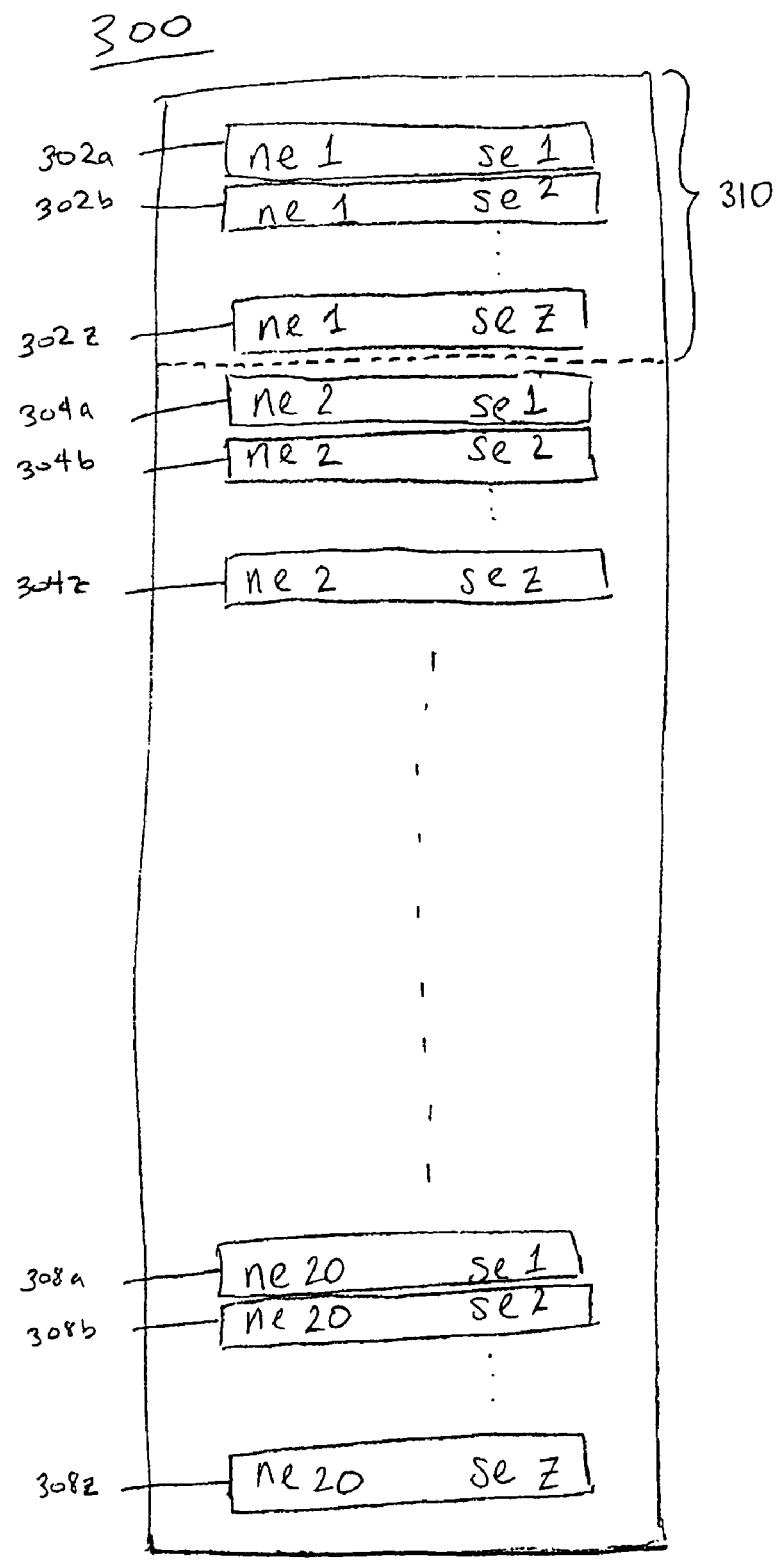

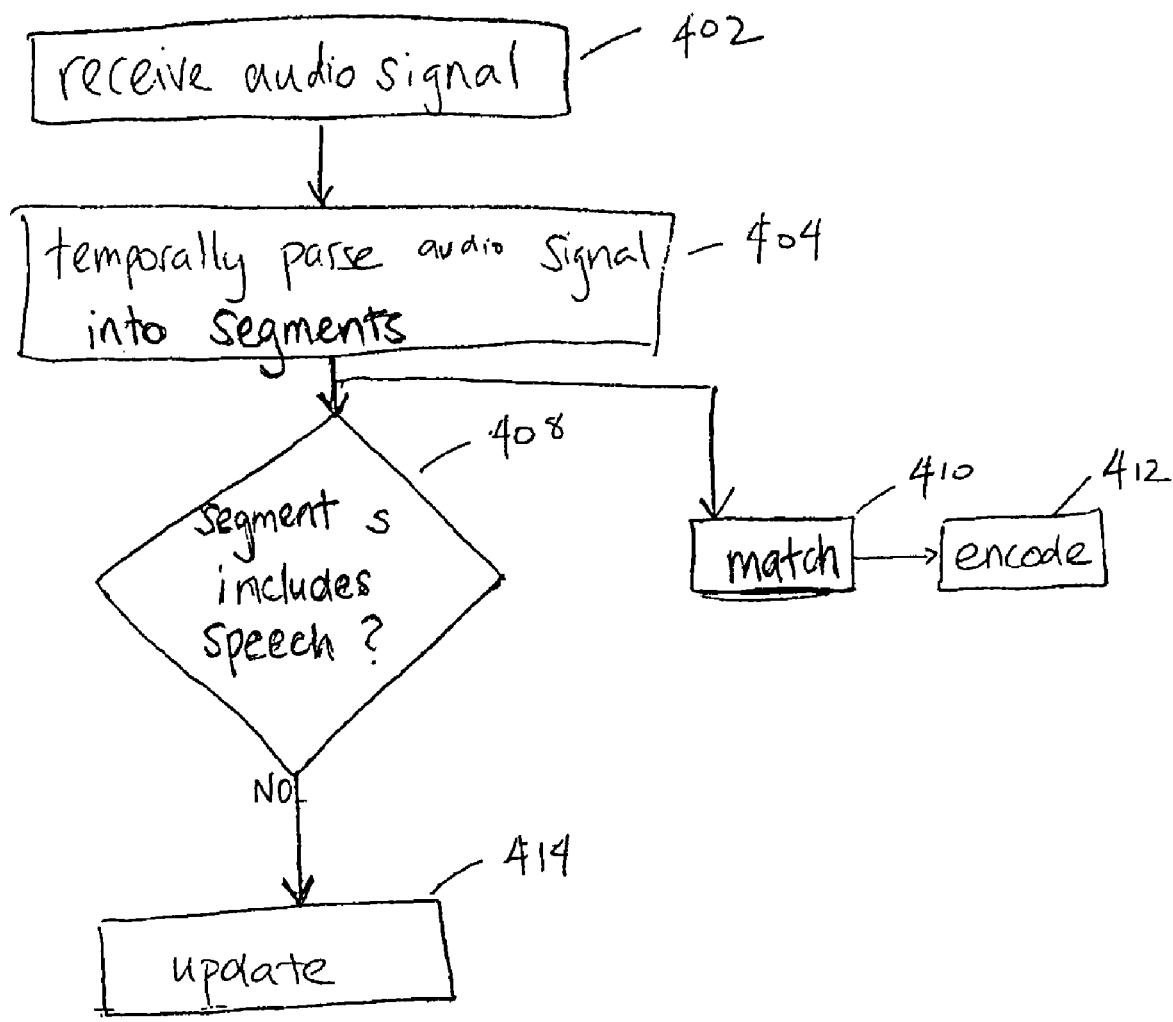

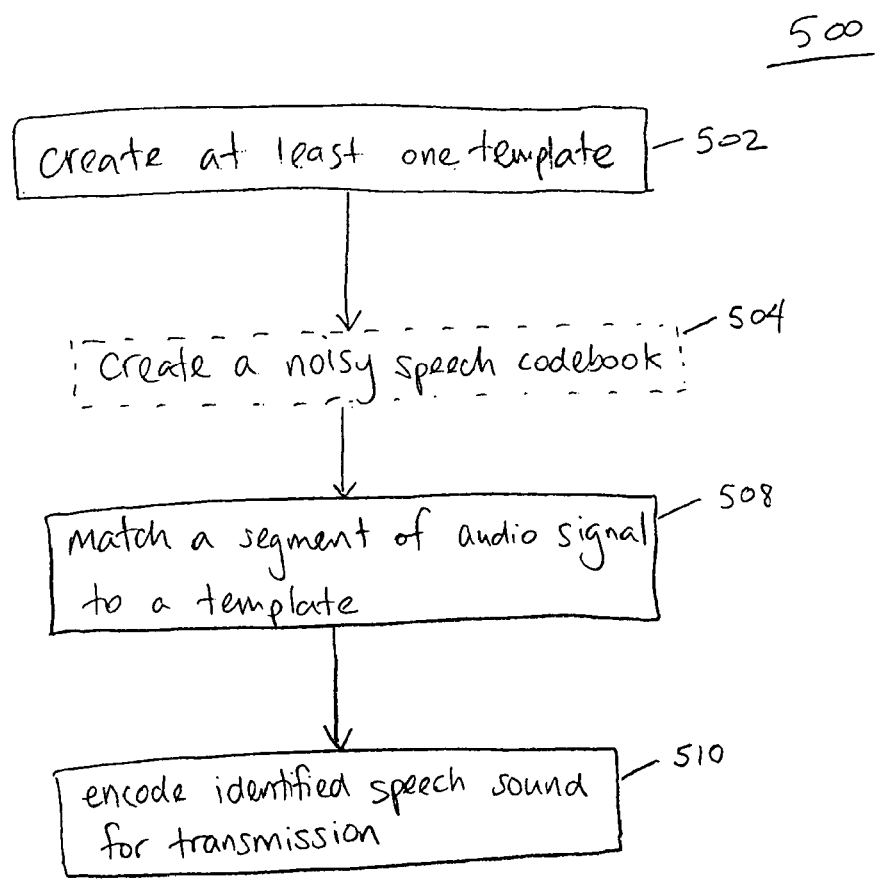

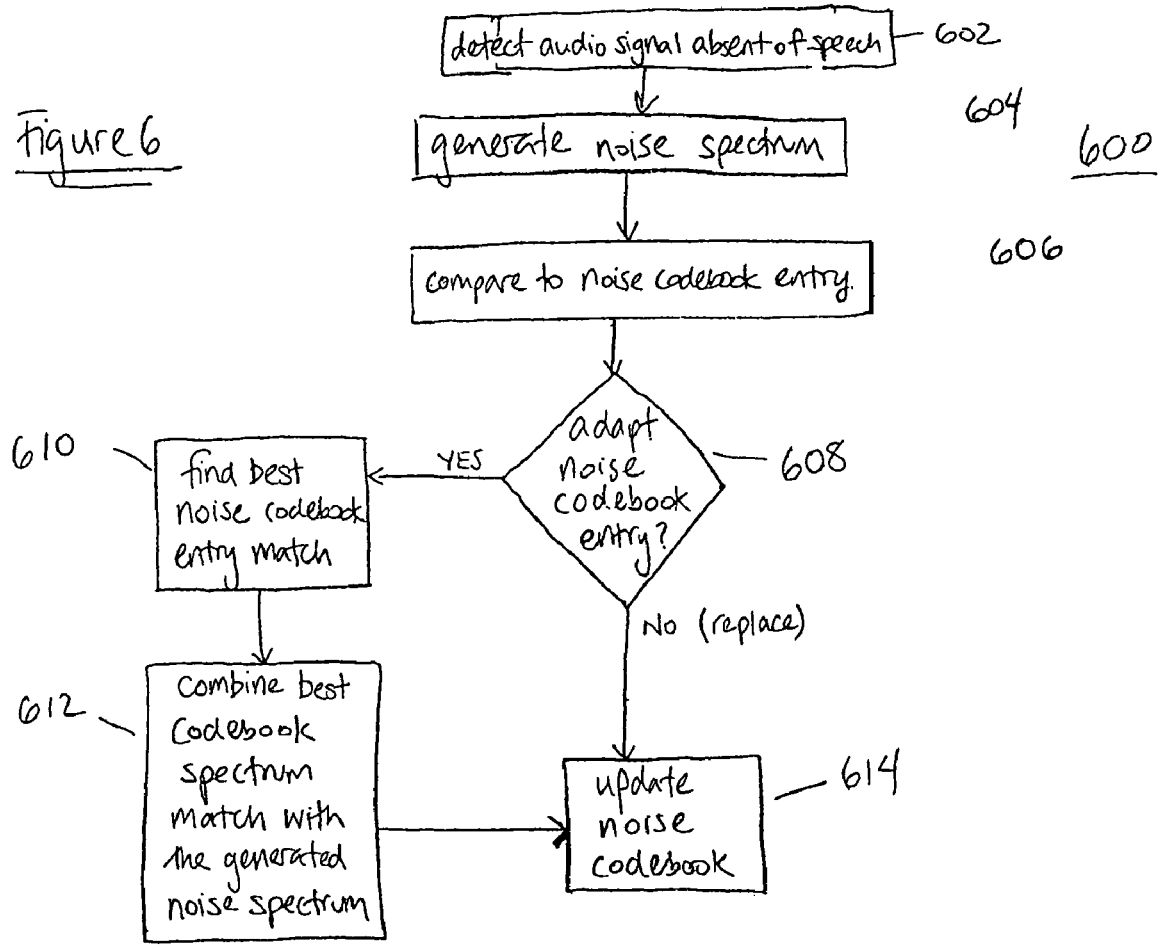

Figure 7

 700

| Segment Length: 180 ms | |
| --- | --- |
| Parameters | Bits |
| Voicing codebook entry index | 15 |
| Speech codebook entry index (3 stages) | 39 |
| Total bits / segment | 54 |
| Data rate (bps) | 300 |

 730

| Segment Length: 90 ms | |
| --- | --- |
| Parameters | Bits |
| Voicing codebook entry index | 15 |
| Speech codebook entry index (3 stages) | 39 |
| Total bits / segment | 54 |
| Data rate (bps) | 600 |

 760

| Segment Length: 90 ms | |
| --- | --- |
| Parameters | Bits |
| Voicing codebook entry index | 15 |
| Speech codebook entry index (6 stages) | 75 |
| Total bits / segment | 90 |
| Data rate (bps) | 1000 |

SPEECH ANALYZING SYSTEM WITH ADAPTIVE NOISE CODEBOOK

CROSS REFERENCE TO RELATED APPLICATIONS

This application claims priority under 35 U.S.C. §119(e) to U.S. Provisional Application No. 60/652,931 titled "Noise Robust Vocoder: Advanced Speech Encoding" filed Feb. 15, 2005, and U.S. Provisional Application No. 60/658,316 titled "Methods and Apparatus for Noise Robust Vocoder" filed Mar. 2, 2005, the entirety of which are hereby incorporated by reference.

GOVERNMENT CONTRACT

The U.S. Government has a paid-up license in this invention and the right in limited circumstances to require the patent owner to license others on reasonable terms as provided for by the terms of Contract No. N00024-03-C-6314 awarded by the Naval Sea Systems Command.

BACKGROUND

Speech analyzing systems match a received speech signal to a stored database of speech patterns. One system, a speech recognizer, interprets the speech patterns, or sequences of speech patterns to produce text. Another system, a vocoder, is a speech analyzer and synthesizer which digitally encodes an audio signal for transmission. The audio signal received by either of these devices often includes environmental noise. The noise acts to mask the speech signal, and can degrade the quality of the output speech of a vocoder or decrease the probability of correct recognition by a speech recognizer. It would be desirable to filter out the environmental noise to improve the performance of a vocoder or speech recognizer.

SUMMARY

The invention, in various embodiments, addresses the issue of encoding speech in an audio signal containing noise. According to one aspect, this is achieved through the use of an adaptive noise codebook.

In one approach, the invention provides systems and methods for identifying speech sounds in an audio signal. According to one aspect, this is achieved through the use of a speech codebook and an adaptive noise codebook. The speech codebook includes a plurality of speech codebook entries corresponding to speech sounds, and the noise codebook includes a plurality of noise codebook entries corresponding to noise sounds. According to one feature, upon receipt of an audio signal including noise sounds, a noise codebook entry is updated based on the noise sounds. According to another feature, upon receipt of an audio signal including speech, speech sounds in the audio signal are identified using the speech codebook and noise codebook.

According to one implementation, a speech sound is identified by creating one or more noisy speech templates as a function of the speech codebook entries and the noise codebook entries, and matching a segment of the audio signal to a noisy speech template. In one embodiment, a noisy speech template is created by combining a speech codebook entry with a noisy codebook entry. According to one feature, the speech codebook entry and the noise codebook entry are each characterized by a vector comprising a gain parameter and at least one line spectral frequency parameter. The speech codebook entry may be combined with the noise codebook entry by converting the vectors into autocorrelation parameter vectors and adding the autocorrelation parameter vectors. According to a further embodiment, the matching of a segment of the audio signal to a noisy speech template is terminated upon identification of an acceptable match.

According to one configuration, the identified speech sounds and pauses are digitally encoded for transmission. According to one feature, the identified speech sounds and pauses are encoded at a bit rate of less than 2500 bps. According to another feature, the identified speech sounds and pauses are encoded at a variable bit rate. The bit rate for encoding an identified speech sound or a pause may be a function of the characteristics of the speech sound or pause.

In one embodiment, a noisy speech codebook is used in identifying the speech sounds. The noisy speech codebook includes a plurality of noisy speech templates. A template may be created as a function of a speech codebook entry and a noise codebook entry. The noisy speech codebook may include a plurality of templates created as a function of the plurality of speech codebook entries and a first noise codebook entry. In this embodiment, the noisy speech codebook may be updated based on a second plurality of templates created as a function of the plurality of speech codebook entries and a second noise codebook entry. According to an alternative embodiment, the noisy speech codebook includes a plurality of templates created as a function of the plurality of speech codebook entries and the plurality of noise codebook entries.

According to one feature, a noise codebook entry similar to the noise component of the audio signal is selected. This noise codebook entry may be used to create noisy speech templates.

According to one implementation, the audio signal is processed to detect the presence of speech in the audio signal. Segments of the audio signal absent of speech may be used to generate noise codebook entries. According to one embodiment, the audio signal is temporally parsed into segments. The segments may be processed to detect the presence of speech in a segment.

According to one feature, a speech codebook entry includes characteristics of a speech sound, and a noise codebook entry includes characteristics of a noise sound. The characteristics may include frequency, duration, amplitude, and gain characteristics. The characteristics may include parameters describing a frequency versus amplitude spectrum corresponding to a speech sound, or parameters describing a frequency versus amplitude spectrum corresponding to a noise sound. The characteristics may include parameters describing a frequency versus amplitude spectrum corresponding to a segment of the audio signal. These parameters may include at least one of gain and predictor coefficients, gain and reflection coefficients, gain and line spectral frequencies, and autocorrelation coefficients. In one embodiment, the characteristics of a segment of the audio signal are matched with the characteristics of a speech codebook entry and the characteristics of a noise codebook entry.

According to one feature, an entry in the noise codebook may be updated. The noise codebook entry may be updated by adapting the entry based on a segment of the audio signal absent of speech. The noise codebook entry may be updated by replacing the entry with a new entry generated from a segment of the input audio signal absent of speech. According to one implementation, the noise codebook entry updated is the least frequently used noise codebook entry. According to another implementation, the noise codebook entry updated is the least recently used noise codebook entry. According to a further implementation, the noise codebook entry updated is the least recently updated noise codebook entry. According to still another implementation, the noise codebook entry updated is the entry that is most similar to a new entry generated from a segment of the audio signal absent of speech.

According to one embodiment, the adaptive noise codebook includes at least 10 entries. According to another embodiment, the adaptive noise codebook includes at least 20 entries. According to another embodiment, the adaptive noise codebook includes at least 50 entries.

According to various embodiments, a voicing codebook is used in identifying speech sounds. The voicing codebook may include a plurality of voicing codebook entries. According to one feature, a voicing codebook entry corresponds to a voicing characteristic. The voicing characteristic my include any of presence of voicing, absence of voicing, pitch, and pitch trajectory. According to another feature, a voicing codebook entry represents at least one frame from an audio signal.

In one configuration, the audio signal is temporally divided into frames. A frame may have a predetermined duration, or a frame may have a variable duration. In one embodiment, the audio signal is temporally divided into segments. According to one feature, a segment comprises at least one of a frame, a plurality of sequential frames, and a plurality of overlapping frames.

According to another aspect, the invention provides a device including a receiver for receiving an audio signal, a first database for storing a plurality of speech codebook entries representative of a plurality of speech sounds, a second database for storing a plurality of noise codebook entries representative of a plurality of noise sounds, a first processor for updating an entry in the noise codebook based on noise sounds in the audio signal, and a second processor for identifying speech sounds in the audio signal as a function of the speech codebook entries and the noise codebook entries.

In one embodiment, the second processor of the device includes a template processor, which combines a noise codebook entry and a speech codebook entry and creates at least one template. Additionally, the second processor includes a match processor, which matches a segment of the audio signal with one of the at least one templates.

According to one implementation, the second processor creates a template by combining at least one speech codebook entry with at least one noise codebook entry. According to one feature, the at least one speech codebook entry and the at least one noise codebook entry each include a vector having a gain parameter and at least one line spectral frequency parameter. According to a further embodiment, the second processor further includes a transform processor for transforming the speech codebook entry vector and the noise codebook entry vector into autocorrelation parameter vectors, and adding the autocorrelation parameter vectors.

According to one embodiment, the device further includes a third processor for digitally encoding the identified speech sounds and pauses for transmission. The third processor may include an encoder that encodes the identified speech sounds and pauses at a bit rate of less than 2500 bits per second. The third processor may include an encoder that encodes the identified speech sounds and pauses at a variable bit rate. The third processor may determine the bit rate for encoding one of an identified speech sound and a pause as a function of the characteristics of one of the identified speech sound and pause.

In one configuration, the device further includes a third database for storing a noisy speech codebook including a plurality of templates. According to one implementation, the second processor creates a template as a function of at least one speech codebook entry and at least one noise codebook entry. The second processor may create the plurality of templates as a function of the plurality of speech codebook entries and a first noise codebook entry. According to one feature, the second processor includes a noisy speech codebook updater for updating the noisy speech codebook based on a second plurality of templates created as a function of the plurality of speech codebook entries and a second noise codebook entry. According to another feature, the second processor creates the plurality of templates as a function of the plurality of speech codebook entries and the plurality of noise codebook entries.

In one embodiment, the device includes a fourth processor for detecting speech in a segment of the audio signal. According to one feature, the first processor generates noise codebook entries from segments of the audio signal absent of speech.

According to one feature, the second processor selects a noise codebook entry as a function of a noise component of the audio signal.

According to one embodiment, the device includes a third processor for temporally parsing the audio signal into segments. The third processor may detect the presence of speech in a segment of the audio signal.

According to one feature, a speech codebook entry includes characteristics of a speech sound, and a noise codebook entry includes characteristics of a noise sound. In one embodiment, the device includes a third processor for matching the characteristics of at least one of a speech codebook entry and a noise codebook entry with characteristics of a segment of the audio signal. The characteristics may include at least one of frequency, duration, amplitude, and gain characteristics. The characteristics may include parameters describing a frequency versus amplitude spectrum corresponding to at least one of a speech sound and a noise sound. Additionally, the characteristics may include parameters describing a frequency versus amplitude spectrum corresponding to a segment of the audio signal. In this embodiment, the parameters may include at least one of gain and predictor coefficients, gain and reflection coefficients, gain and line spectral frequencies, and autocorrelation coefficients.

According to one embodiment, the first processor updates an entry in the noise codebook by adapting the entry based on a segment of the audio signal absent of speech. According to an alternative embodiment, the first processor updates an entry in the noise codebook by replacing the entry with a new entry generated from a segment of the audio signal absent of speech.

In one configuration, the device includes a third database for storing a voicing codebook including a plurality of voicing codebook entries. A voicing codebook entry may correspond to at least one voicing characteristic. According to one feature, the at least one voicing characteristic includes at least one of presence of voicing, absence of voicing, pitch, and pitch trajectory.

BRIEF DESCRIPTION OF THE FIGURES

The foregoing and other objects and advantages of the invention will be appreciated more fully from the following further description thereof, with reference to the accompanying drawings. These depicted embodiments are to be understood as illustrative of the invention and not as limiting in any way.

FIGS. 2A-2C are block diagrams of a noise codebook, a voicing codebook, and a speech codebook, of a vocoding system, according to an illustrative embodiment of the invention.

FIG. 3 is a diagram of a noisy speech codebook, according to an illustrative embodiment of the invention.

FIG. 4 is a flow chart of a method 400 of processing an audio signal, according to an illustrative embodiment of the invention.

FIG. 5 is a flow chart of a method of encoding speech, according to an illustrative embodiment of the invention.

FIG. 6 is a flow chart of a method of updating a noise codebook entry, according to an illustrative embodiment of the invention.

FIG. 7 shows three tables with exemplary bit allocations for signal encoding, according to an illustrative embodiment of the invention.

DETAILED DESCRIPTION

To provide an overall understanding of the invention, certain illustrative embodiments will now be described, including systems, methods and devices for providing improved analysis of speech, particularly in noisy environments. However, it will be understood by one of ordinary skill in the art that the systems and methods described herein can be adapted and modified for other suitable applications and that such other additions and modifications will not depart from the scope hereof.

Figure 1:
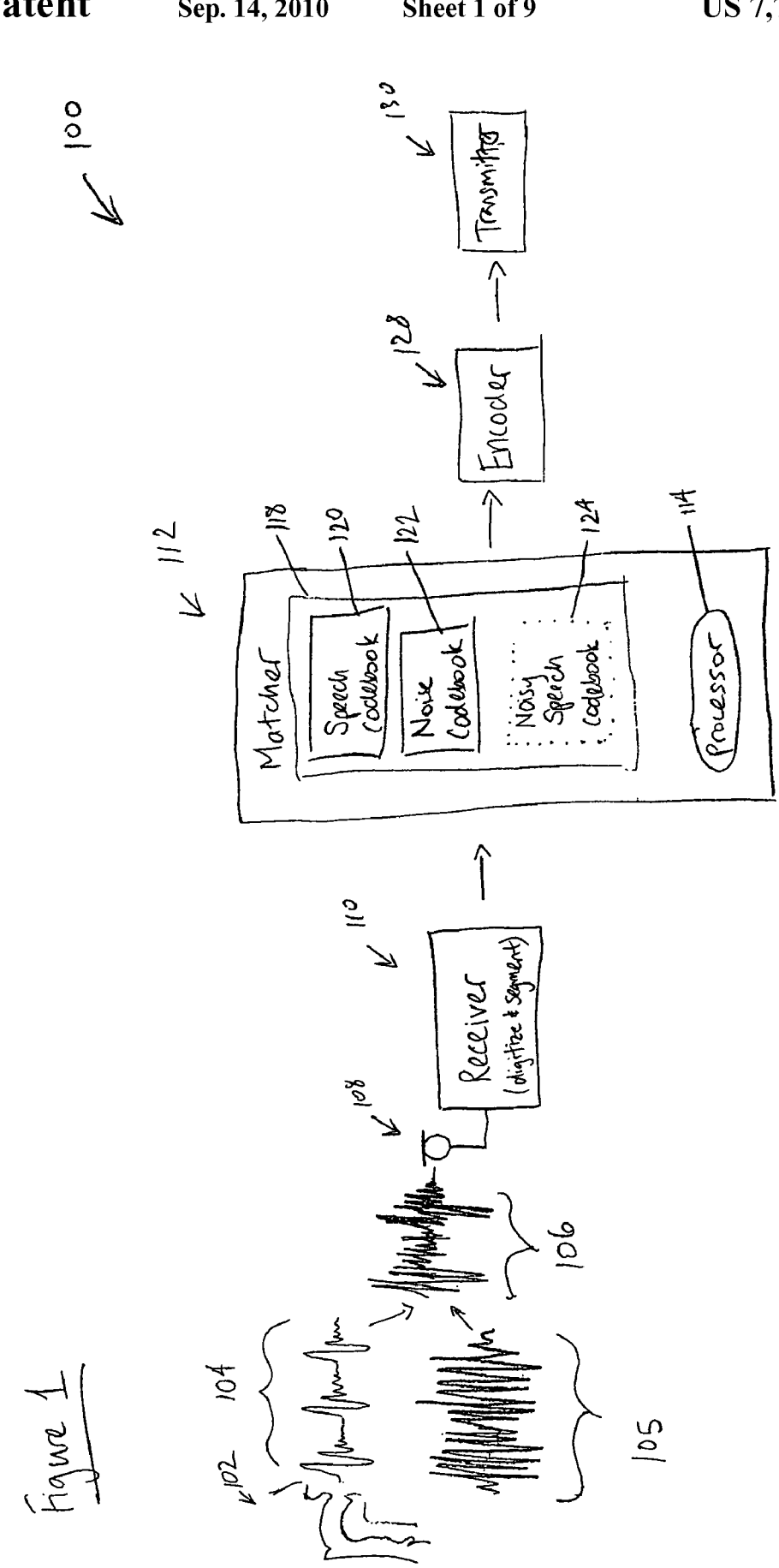
FIG. 1 is a diagram of a speech encoding system, according to an illustrative embodiment of the invention.

FIG. 1 shows a high level diagram of a system 100 for encoding speech. The speech encoding system includes a receiver 110, a matcher 112, an encoder 128, and a transmitter 130. The receiver 110 includes a microphone 108 for receiving an input audio signal 106. The audio signal may contain noise 105 and a speech waveform 104 generated by a speaker 102. The receiver 110 digitizes the audio signal, and temporally segments the signal. In one implementation, the input audio signal is segmented into frames of a predetermined length of time, for example, between 20-25 ms. In one particular implementation, the audio signal is segmented in 22.5 ms frames. In other implementations, the frame may be about 5 ms, about 7.5 ms, about 10 ms, about 12.5 ms, about 15 ms, about 18 ms, about 20 ms, about 25 ms, about 30 ms, about 35 ms, about 40 ms, about 50 ms, about 60 ms, about 75 ms, about 100 ms, about 125 ms, about 250 ms or about 500 ms. In some embodiments, the frame length may be altered dynamically based on the characteristics of the speech. For example, using a variable frame length, a 10 ms frame may be used for a short sound, such as the release burst of a plosive, while a 250 ms frame may be used for a long sound, such as a fricative. A segment or block of the audio signal may comprise a plurality of temporally contiguous or overlapping frames, and may have a variable duration or a fixed duration. The receiver 110 sends the digitized signal to a matcher 112.

The matcher 112, which identifies the speech sounds in an audio signal, may include a processor 114 and at least one database 118. The database 118 stores a speech codebook 120, a noise codebook 122, and, optionally, a noisy speech codebook 124. According to alternative embodiments, the codebooks 120, 122, and 124 may be stored in separate databases. The processor 114 creates the noisy speech codebook 124 as a function of the speech codebook 120 and the noise codebook 122, as described in greater detail with respect to FIGS. 2 and 3. The noisy speech codebook 124 includes a plurality of noisy speech templates. Alternatively, the processor 114 may create a single noisy speech template. The processor 114 matches a segment of the audio signal to a noisy speech template. The matching noisy speech entry information is sent to an encoder 128. The encoding process is described further in relation to FIG. 5. The encoder 128 encodes the data and sends it to a transmitter 130 for transmission. The functionality of the matcher 112 and the encoder 128 can be implemented in software, using programming languages know in the art, hardware, e.g. as digital signal processors, application specific integrated circuits, programmable logic arrays, firmware, or a combination of the above.

FIG. 2A is a block diagram of a noise codebook 202, such as the noise codebook 122 of the matcher 112 of the speech encoding system 100 of FIG. 1. The noise codebook 202 contains t (where t is an integer) noise entries 212a-212t (generally "noise entries 212"). Each noise entry 212 represents a noise sound. The noise entries 212 are continuously updated, as described below with respect to FIG. 6, such that the noise entries 212 represent the most recent and/or frequent noises detected by the speech encoding system 100.

An enlargement of one exemplary noise entry, noise entry 212b, is also shown in FIG. 2A. The noise entry 212b stores a sequence of parameter values 214, collectively referred to as a "parameter vector," describing a corresponding noise. The parameter values 214 may include, for example, a frequency vs. amplitude spectrum or a spectral trajectory. According to one embodiment, the parameter values 214 represent an all-pole model of a spectrum. The parameter values 214 may also specify one or more of duration, amplitude, frequency, and gain characteristics of the noise. In addition, the parameter values 214 may also specify one or more of gain and predictor coefficients, gain and reflection coefficients, gain and line spectral frequencies, and autocorrelation coefficients.

According to various embodiments, the noise codebook 202 may contain 2, 4, 8, 16, 32, 64, 128, 256, 512, 1024, 2048, 4096, 8192, or 16384 noise entries 212. Additionally, the codebook may contain any integer number of noise entries. According to a preferred embodiment, the noise codebook 202 contains 20 noise entries 212. According to an alternative embodiment, each noise codebook entry represents a plurality of frames of noise.

Additionally, each noise entry 212 includes a usage data counter 218. In one implementation, the usage data counter 218 counts how many times the corresponding noise entry 212 has been adapted. According to one embodiment, the usage data counters 218 of noise entries 212 that have never been adapted or replaced store a value of zero, and every time a noise entry 212 is adapted, the usage data counter 218 is incremented by one. When a noise entry 212 is replaced, the corresponding usage data counter 218 is reset to one. In another embodiment, when a noise entry 212 is replaced, the corresponding usage data counter 218 is reset to zero. In an alternative embodiment, the usage data counters 218 track how many times the noise entries 212 have been selected.

Figure 2B:
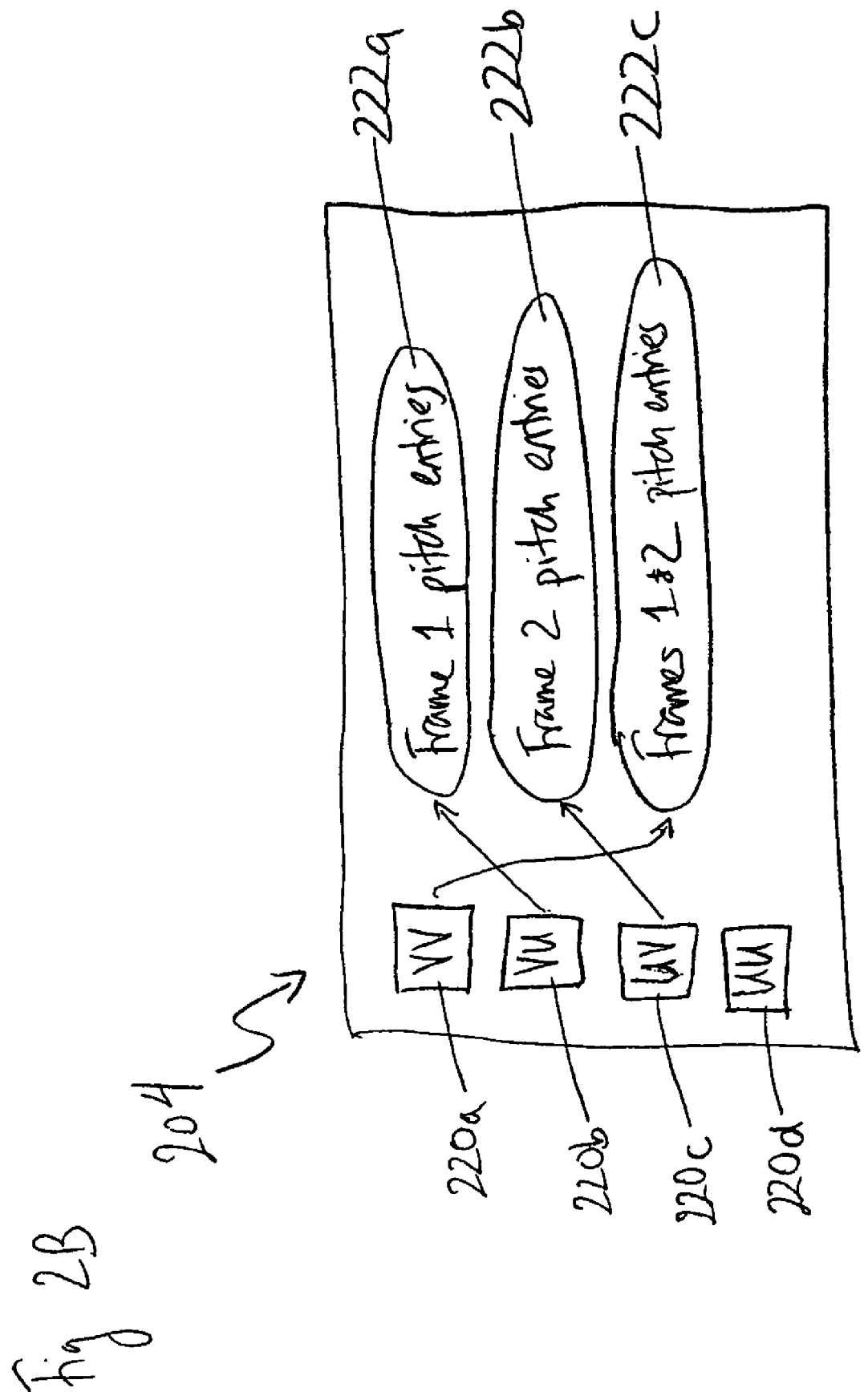

FIG. 2B is a block diagram of a voicing codebook 204, which may also be included in the matcher 112 of the speech encoding system 100 of FIG. 1. The voicing codebook 204 includes voicing entries 220 representing different voicing patterns. Speech sounds can generally be classified as either voiced or unvoiced. A voicing pattern corresponds to a particular sequence of voiced and unvoiced speech sounds. Thus, for voicing patterns characterizing sequences of two speech sounds, there are 4 possible voicing patterns: voiced-voiced (vv), voiced-unvoiced (vu), unvoiced-voiced (uv), and unvoiced-unvoiced (uu). For voicing patterns characterizing sequences of three speech sounds, there are 8 possible patterns: vvv, vvu, vuv, vuu, uvv, uvu, uuv, uuu. However, sequences vuv and uvu can be ignored, because a speech signal does not typically include such a short period of voicing or devoicing, as would be represented by the middle frame in these sequences. According to an alternative embodiment, the voicing codebook 204 may contain only 2 entries 220, each representing one frame of sound, i.e. one "voiced" entry and one "unvoiced" entry. According to other embodiments, the voicing codebook 204 may contain 10 voicing entries 220 representing 4 frames each or 68 voicing entries representing 8 frames each (note again, that some possible voicing patterns can be ignored as explained above).

The illustrative voicing codebook 204 includes voicing entries 220a-220d corresponding to four sound voicing patterns. Each voicing entry 220a-220d corresponds to a two frame voicing pattern. Entry 220a, a "voiced-voiced" voicing entry, corresponds to two frames of a voiced signal. Entry 220b, a "voiced-unvoiced" voicing entry, corresponds to a first frame of a voiced signal followed by a second frame of an unvoiced signal. Entry 220c, an "unvoiced-voiced" voicing entry, corresponds to a first frame of an unvoiced signal followed by a second frame of a voiced signal. Entry 220d, an "unvoiced-unvoiced" voicing entry, corresponds to two frames of an unvoiced signal. According to one feature, the "unvoiced-unvoiced" voicing entry may represent two frames of unvoiced speech, two frames of speech-absent environmental noise, or one frame of unvoiced speech and one frame of speech-absent noise. According to one embodiment, two consecutive frames of the input signal are matched with one of the four entries 220a-220d.

The voicing codebook 204 also contains pitch entries 222a-222c corresponding to pitch and pitch trajectories. Pitch entries 222a contain possible pitch values for the first frame, corresponding to the "voiced-unvoiced" voicing entry 220b. Pitch entries 222b contain possible pitch values for the second frame, corresponding to the "unvoiced-voiced" voicing entry 220c. Pitch entries 222c contain pitch values and pitch trajectories for the first and second frames, corresponding to the "voiced-voiced" voicing entry 220d. The pitch trajectory information includes how the pitch is changing over time (for example, if the pitch is rising or falling). According to one embodiment, pitch entries 222a include 199 entries, pitch entries 222b include 199 entries, and pitch entries 222c include 15,985 entries. However, according to alternative embodiments, the pitch entries 222a, 222b, and 222c may include 50, 100, 150, 250, 500, 1000, 2500, 5000, 7500, 10000, 12500, 15000, 17500, 20000, 25000, or 50000 entries.

FIG. 2C is a block diagram of a speech codebook 208 of the matcher 112 of the speech encoding system 100 of FIG. 1. The speech codebook 208 contains several multi-stage speech codebooks 230a-230d. In general, a speech encoding system maintains one speech codebook 230 for each voicing pattern entry 220 in the voicing codebook 204. According to one embodiment, the voicing entry 220a-220d selected from the voicing codebook 204 determines which speech codebook 230a-230d is used to identify speech sounds. For example, to recognize speech sounds in a voiced-voiced sequence of frames, the matcher 112 utilizes the "voiced-voiced" (vv) codebook 230a. Similarly, to recognize speech sounds in an unvoiced-voiced sequence of frames, the matcher 112 utilizes the "unvoiced-voiced" (uv) codebook 230c. The vv-codebook 230a is shown enlarged and expanded. This codebook 230a includes three stage-codebooks 232, 234, and 236, each containing an integer number of entries. The multi-stage stage-codebooks 232-236 enable accurate identification of the speech signal with a fraction of the entries that would be necessary in a single-stage codebook system. According to the illustrative embodiment, each stage-codebook 232, 234, and 236 contains 8192 entries. According to alternative embodiments, the stage-codebooks 232, 234, and 236 may contain any number of entries. In various embodiments, the stage-codebooks contain 8, 16, 32, 64, 128, 256, 512, 1024, 2048, 4096, 8192, 16384, 32768, and 65536 entries. Additionally, each stage-codebook 232, 234, and 236 may contain a different number of entries.

An enlarged representation of each of the stage-codebooks 232, 234, and 236 is shown in FIG. 2C. The stage 1 stage-codebook 232 contains stage 1 entries 240a-240z (generally "stage 1 entries 240"). Each stage 1 entry 240 includes a speech parameter vector, similar to the noise parameter vectors described above with respect to the noise codebook entry 212b. The stage 2 stage-codebook 234 contains stage 2 entries 244a-244z (generally "stage 2 entries 244"), each stage 2 entry 244 including a speech parameter vector. The stage 3 stage-codebook 236 contains stage 3 entries 248a-248z (generally "stage 3 entries 248"). Each stage 3 entry includes a speech parameter vector.

According to one embodiment, each speech codebook entry 240, 244, and 248 represents a plurality of frames of speech. According to this embodiment, each speech codebook entry 240, 244, and 248 represents a spectral trajectory, wherein a spectral trajectory is the sequence of spectra that model the plurality of frames. In various embodiments, each speech codebook entry 240, 244, and 248 represents 2, 4, 8, 10, 15, 20, 30, 40, or 50 frames of speech. In a preferred embodiment, each codebook entry 240, 244, and 248 represents four frames of speech.

Each entry in the stage-2 speech codebook 234 represents a possible perturbation of any entry 240 in the stage-1 speech codebook 232. According to one implementation, in which each entry 240 and 244 represents a spectral trajectory, a selected stage-1 codebook entry, e.g. stage-1 codebook entry 240m, is combined with a selected stage-2 codebook entry, e.g. stage-2 codebook entry 244n, by combining the corresponding spectra of the entries 240m and 244n. For example, if $g1(\theta)$ is the spectrum of the $k^{th}$ frame from stage-1 codebook entry 240m and $g2(\theta)$ is the spectrum of the $k^{th}$ frame from stage-2 codebook entry 244n, their product, $g1(\theta)*g2(\theta)$, for each k, provides the combined speech spectral trajectory.

In one implementation, the spectra of a spectral trajectory are represented using 257 samples of the log-spectrum:

$$g_p = \log g(2*\pi*p/256) \text{ for } p=0, 1, \ldots, 256$$

where the samples are taken at equally spaced frequencies $\theta = 2*\pi*p/256$ from p=0 to p=256. Thus, for a spectral trajectory including three frames, the stage-codebook entry 240, 244, or 248 is a vector of 3*257 values representing a sequence of 3 log-spectra. By storing these log-values in each stage-codebook 232, 234, and 236, a vector from the stage-1 codebook 232 may be summed with a vector from the stage-2 codebook to create a vector of 3*257 values representing a sequence of 3 log-spectra. The sequence of spectra can be obtained from these log-spectra by exponentiation; this yields a vector of 3*257 nonnegative values. Each group of 257 nonnegative values can be converted into a sequence of autocorrelation values, as described further in relation to FIG. 5.

This process may be repeated with the stage-3 codebook entries 248. The vector from the stage-1 codebook entry 240m may be summed with the vector from the stage-2 codebook entry 244n and the vector from the stage-3 codebook entry 248p to yield a vector of 3*257 values representing a sequence of three log-spectra.

As described in greater detail with respect to FIG. 5, the matcher 112 uses the stage-codebooks 232, 234, and 236 in conjunction with the noise codebook 202 to derive the best speech codebook entry match. In one implementation, the matcher 112 combines the parameter vectors of corresponding frames of selected stage-1 entry 240*m*, stage-2 entry 244*n*, and stage-3 entry 248*p* from each stage codebook 232, 234, and 236, and creates a single speech spectrum parameter vector for each corresponding frame.

To take into account noise obscuring the speech sounds in the input signal, the matcher 112 compares segments of the audio signal with noisy speech templates instead of comparing segments to the speech stage-codebooks 232, 234, and 236 directly. To create a noisy speech template, the parameter vector 214 of a noise codebook entry 212 and the parameter vector of the combined stage-1 codebook entry 240, stage-2 codebook entry 244, and stage-3 codebook entry 248, are converted to autocorrelation parameter vectors, as described in further detail with respect to FIG. 5. According to one implementation, the autocorrelation parameters combined to form a frame of the noisy speech template. Noisy speech templates are stored in noisy speech codebooks.

According to one embodiment, a plurality of noisy speech templates are generated and stored in a noisy speech codebook. FIG. 3 is a conceptual diagram of one such noisy speech codebook 300. The noisy speech codebook 300 contains templates 302*a*-302*z*, 304*a*-304*z*, and 308*a*-308*z*, where each template is a noisy speech codebook entry. Templates 302*a*-302*z* are created as a function of a first noise codebook entry (ne1) and the entries (se1, se2, . . . , sen) of the speech codebook, templates 304*a*-304*z* are created as a function of a second noise codebook entry (ne2) and the entries (se1, se2, . . . , sen) of the speech codebook, and templates 308*a*-308*z* are created as a function of a twentieth noise codebook entry (ne20) and the entries (se1, se2, . . . , sen) of the speech codebook.

According to one embodiment, a noisy speech template is created for each stage-codebook entry 240, 244, and 248. According to the illustrative embodiment, the noisy speech codebook 300 is generated by combining the autocorrelation vectors of a selected sequence of noise codebook entries with the autocorrelation vectors of each frame of a speech codebook entry. However, according to alternative embodiments, the speech encoding system 100 maintains separate noisy speech codebooks for each noise entry. These noisy speech codebooks may be updated by selecting a second noise codebook entry, and replacing each noisy speech codebook entry with a template generated by combining the second noise codebook entry with each speech codebook entry. As shown in FIG. 3, each template 302, 304, and 308 contains indexing information, including which noise codebook entry (ne1, ne2, . . . , ne20) and which speech codebook entry (se1, se2, . . . , sen) were combined to form the selected template. According to some embodiments, the templates 302*a*-302*z*, 304*a*-304*z*, and 308*a*-308*z* also contain indexing information for the voicing codebook entry used to form the selected template.

FIG. 4 is a flow chart of a method 400 of processing an audio signal. The method 400 may be employed by a processor, such as the processor 114 of FIG. 1. The method 400 begins with receiving an audio signal (step 402). The audio signal includes noise and may include speech. A processor temporally parses the audio signal into segments (step 404). As mentioned above, each segment includes one or more frames. For a selected segment, the processor determines whether any of the frames of the segment includes speech (step 408). The segment is transferred to a matcher which identifies speech sounds (step 410), as described below with respect to FIG. 5. The matcher may be a part of the same processor, or it may be another processor. Once the audio signal is matched to a corresponding speech codebook entry, the speech codebook entry is encoded for transmission (step 412). If the segment does not include speech, it is used to update the noise codebook (step 414), as described in further detail with regard to FIG. 6.

FIG. 5 is a block diagram of a method 500 of encoding speech. The method may be employed in a speech analyzing system, such as a speech recognizer, a speech encoder, or a vocoder, upon receiving a signal containing speech. The method 500 begins with creating a noisy speech template (step 502).

Referring back to FIG. 2, a noisy speech template is created as a function of the parameter vector 214 of a noise codebook entry 212 and the parameter vector of a speech codebook entry. The parameter vectors are converted to autocorrelation parameter vectors, which are combined to form a frame of a noisy speech template.

An autocorrelation parameter vector is generated from a speech parameter vector. The nth autocorrelation value $r_n$ of an autocorrelation parameter vector G, may be calculated as a function of the spectrum g(θ) representing a frame of a speech codebook entry using the following formula:

$$r_n = \int_{-\pi}^{\pi} g(\theta) e^{in\theta} \frac{d\theta}{2\pi}$$

The autocorrelation parameter vector G has a length N, where N is the number of samples in the frame represented by g(θ). Similarly, for a noise codebook entry 212, the nth autocorrelation value $q_n$ of an autocorrelation parameter vector M, may be calculated as a function of the spectrum μ(θ) representing the frame of the noise-codebook entry 212, using the following formula:

$$q_n = \int_{-\pi}^{\pi} \mu(\theta) e^{in\theta} \frac{d\theta}{2\pi}$$

The autocorrelation parameter vector M also has a length N, where N is the number of samples in the frame represented by μ(θ).

According to one implementation, a frame of a noisy-speech template autocorrelation parameter vector S is the sum of a speech entry autocorrelation parameter vector G and a noise entry autocorrelation parameter vector M:

$$S=G+M$$

According to a further embodiment, the spectrum s(θ) representing a frame of a noisy-speech template may be calculated as the sum of the spectrum g(θ) representing a frame of a speech-codebook entry and the spectrum μ(θ) representing the frame of a noise codebook entry.

$$s(\theta)=g(\theta)+\mu(\theta)$$

Optionally, the noisy speech templates may be aggregated to form a noisy speech codebook (step 504), as described in relation to FIG. 3.

Next, a processor matches a segment of the audio signal containing speech to a noisy speech template (step 508), thereby identifying the speech sound.

Referring to FIGS. 2 and 5, to match the segment of the audio signal (step 508), the matcher 112 employs the noisy speech codebook 300, derived from the stage-codebooks 232, 234, and 236 as follows. The matcher 112 uses the stage-codebooks 232, 234, and 236 sequentially to derive the best noisy speech template match. According to this embodiment, each stage-codebook entry 240, 244, and 248 represents a plurality of frames, and thus represents a spectral trajectory. Each noise entry 212 represents one spectrum. First, the matcher 112 compares the noisy speech templates derived from the noise entries 212 and the stage 1 entries 240 to a segment of the input signal (i.e. one or more frames). The noisy speech template that most closely corresponds with the segment, e.g. the template derived from the frames of the stage-1 entry 240m and a plurality of noise entries 212, is selected.

Next, the stage 2 stage-codebook 234 is used. The matcher 112 combines each stage 2 entry 244 with the selected stage 1 entry 240m, creates noisy speech templates from this combination and the selected noise entries 212, and matches the noisy speech templates to the segment. The matcher 112 identifies and selects the noisy speech template used in forming the best match, e.g. the template derived from the combination of stage 1 entry 240m, stage 2 entry 244n, and the selected noise entries 212.

Last, the stage 3 stage-codebook 236 is used. The matcher 112 combines each stage 3 entry 248 with the selected stage 1 entry 240m and stage 2 entry 244n, creates noisy speech templates from this combination and the noise entries 212, and matches the noisy speech templates to the segment. The matcher 112 identifies and selects the noisy speech template, used in forming the best match, e.g. the template derived from stage 1 entry 240m, stage 2 entry 244n, stage 3 entry 248p, and the selected noise entries 212. According to other embodiments, the matcher 112 may select a plurality of noisy speech templates derived from the entries from each stage-codebook 232, 234, and 236, combining the selected entries from one stage with each entry in the subsequent stage. Selecting multiple templates from each stage increases the pool of templates to choose from, improving accuracy at the expense of increased computational cost.

According to one embodiment, to match a segment of the audio signal to an entry in the speech codebook 208 (step 508), the matcher 112 uses stage-codebooks 232, 234, and 236 sequentially, along with the noise codebook 202, to derive the best noisy speech template match. According to this embodiment, each stage-codebook entry 240, 244, and 248 represents a plurality of frames, thus representing a spectral trajectory. Each noise codebook entry 212 represents a single frame, and thus a single spectrum. Therefore, a noise codebook entry spectrum is identified and selected for each frame of a stage-codebook entry.

The matcher 112 begins with a first stage-1 codebook entry, e.g. stage-1 codebook entry 240a, which represents a four-spectrum (i.e. four frame) spectral trajectory. For the first speech spectrum in the stage-1 codebook entry 240a, the matcher 112 creates a set of noisy speech spectra by combining the first speech spectrum with the noise spectrum of each noise entry 212 in the noise codebook 202. The matcher 112 compares each of these noisy speech spectra to the first frame in the audio signal segment, and computes a frame-log-likelihood value (such as the frame log-likelihood value, discussed below) for each noisy speech spectrum. The frame-log-likelihood value represents the probability that the computed noisy speech spectrum matches the first frame of the segment. Based on the frame-log-likelihood values, the matcher 112 determines which noise spectrum yields the highest frame-log-likelihood value for the first frame of the first speech codebook entry 240a.

The matcher 112 repeats this process for each frame in the spectral trajectory of the first stage-1 codebook entry 240a and each corresponding frame of the input audio signal segment, determining which noise spectrum yields the highest frame-log-likelihood value for each frame. The matcher 112 sums the highest frame-log-likelihood value of each frame of the first stage-1 codebook entry 240a to yield the segment-log-likelihood value. The first stage-1 codebook entry 240a segment-log-likelihood value corresponds to the probability that the audio segment matches the combination of the speech spectral trajectory of the first stage-1 codebook entry 240a and the selected noise spectral trajectory that maximizes the segment-log-likelihood.

The matcher 112 repeats this process for each stage-1 codebook entry 240, generating a segment-log-likelihood value and a corresponding noise spectral trajectory for each stage-1 codebook entry 240. The matcher 112 selects the stage-1 codebook entry 240 noise spectral trajectory pairing having the highest segment-log-likelihood value.

After selecting a stage-1 codebook entry-noise spectral trajectory pairing, the matcher 112 proceeds to the stage-2 speech codebook 234. The matcher 112 calculates new spectral trajectories by combining the selected stage-1 codebook entries with each of the stage-2 codebook entries. Using the noise spectral trajectory selected above, the matcher 112 calculates a segment-log-likelihood value for each of the combined spectral trajectories, and selects the stage-2 codebook entry 244 that yields the combined spectral trajectory having the highest segment-log-likelihood value. This represents the "best" combination of stage-1 codebook 232 and stage-2 codebook 234 spectral trajectories. The matcher 112 repeats this process for the stage-3 codebook 236, combining each stage-3 codebook entry 248 with the combination of the selected stage-1 entry 240, stage-2 entry 244, and noise trajectory entries. The received speech sounds can be uniquely identified by the selected stage-1, stage-2, and stage-3 codebooks, the noise codebook entries 212 corresponding to the selected noise trajectory, and the voicing codebook entries 220, which, when combined together, create a noisy speech template.

As mentioned above, the matcher 112 can calculate the likelihood that a noisy speech spectrum matches a frame of an audio signal by employing a Hybrid Log-Likelihood Function ($L_h$) (step 508). This function is a combination of the Exact Log-Likelihood Function ($L_e$) and the Asymptotic Log-Likelihood Function ($L_a$). The Exact function is computationally expensive, while the alternative Asymptotic function is computationally cheaper, but yields less exact results. The Exact function is:

$$L_e(x|s) = -\frac{1}{2}x'R^{-1}x - \frac{1}{2}\ln|2\pi R|$$

where R is a Symmetric Positive-Definite (SPD) covariance matrix and has a block-Toeplitz structure, x is the frame of noisy speech data samples, and s is the hypothesized speech-plus-noise spectrum. The function includes a first part, before the second minus-sign, and a second part, after the second minus-sign. According to one embodiment including a single input signal, R may be a Toeplitz matrix. According to alternative embodiments including a plurality of input signals, R is a block-Toeplitz matrix as described above. The Asymptotic function is:

$$L_a(x|s) = -\frac{N}{2}\int_{-\pi}^{\pi} tr[f(\theta)s(\theta)^{-1}] + \ln|2\pi s(\theta)|\frac{d\theta}{2\pi}$$

According to one embodiment, including a single input signal, the term "$tr[f(\theta)s(\theta)^{-1}]$" is replaced with the term "$f(\theta)s(\theta)^{-1}$". According to one feature, the Asymptotic function shown above is used in embodiments including a plurality of input signals. The Asymptotic function also includes two parts: a first part before the plus-sign, and second part after the plus-sign. The part of the Asymptotic function before the plus corresponds to the first part of the Exact function. Similarly, the part of the Asymptotic function after the plus corresponds to the second part of the Exact function. Combining the first part of the Exact function, for which a known algorithm (the Preconditioned Conjugate Gradient algorithm) reduces the computation cost, with the second part of the Asymptotic function (which can be evaluated using a Fast Fourier Transform) yields the Hybrid Log-Likelihood Function $L_h$:

$$L_h(x|s) = -\frac{1}{2}x'R^{-1}x - \frac{N}{2}\int_{-\pi}^{\pi}\ln|2\pi s(\theta)|\frac{d\theta}{2\pi}$$

This hybrid of the two algorithms is less expensive computationally, without yielding significant loss in performance.

After the matcher has matched a segment of the audio signal to a template, the identified speech sound is digitally encoded for transmission (step 510). According to one implementation, only the index of the speech codebook entry, or of each stage-codebook entry 240, 244, and 248, correlated to the selected noisy speech template, as described above, is transmitted. Additionally, the index of the voicing codebook entry of the selected template may be transmitted. Thus, the noise codebook entry information may not be transmitted. Segments of the audio signal absent of voiced speech may represent pauses in the speech signal or could include unvoiced speech. According to one embodiment, these segments are also digitally encoded for transmission.

FIG. 6 is a block diagram of a method 600 of updating a noise codebook entry. The method 600 may be employed by a processor, such as the processor 114 of FIG. 1. The method 600 begins with the matcher detecting a segment of the audio signal absent of speech (step 602). The segment is used to generate a noise spectrum parameter vector representative of the segment (step 604). According to one embodiment, the noise spectrum parameter vector represents an all-pole spectral estimate computed using an $80^{th}$-order Linear Prediction (LP) analysis.

The noise spectrum parameter vector is then compared with the parameter vectors 214 of one or more of the noise codebook entries 212 (step 606). According to one embodiment, the comparison includes calculating the spectral distance between the noise spectrum parameter vector of the analyzed segment and each noise codebook entry 212.

Based on this comparison, the processor determines whether a noise codebook entry will be adapted or replaced (step 608). According to one embodiment, the processor compares the smallest spectral distance found in the comparison to a predetermined threshold value. If the smallest distance is below the threshold, the noise codebook entry corresponding to this distance is adapted as described below. If the smallest distance is greater than the threshold, a noise codebook entry parameter vector is replaced by the noise spectrum parameter vector.

If a noise codebook entry 212 will be adapted, the processor finds the best noise codebook entry match (step 610), e.g. the noise codebook entry 212 with the smallest spectral distance from the current noise spectrum. The best noise codebook entry match is combined with the noise spectrum parameter vector (step 612) to result in a modified noise codebook entry. According to one embodiment, autocorrelation vectors are generated for the best noise codebook entry match and the noise spectrum parameter vector. The modified codebook entry is created by combining 90% of the autocorrelation vector for best noise codebook entry match and 10% of the autocorrelation vector for the noise spectrum parameter vector. However, any relative proportion of the autocorrelation vectors may be used. The modified noise codebook entry replaces the best noise codebook entry match, and the codebook is updated (614).

Alternatively, a noise codebook entry parameter vector may be replaced by the noise spectrum parameter vector (step 608). According to another embodiment, the noise codebook entry is updated (step 614) by replacing the least frequently used noise codebook entry 212. According to a further embodiment, the noise codebook entry is updated (step 614) by replacing the least recently used noise codebook entry. According still another embodiment, the noise codebook entry is updated by replacing the least recently updated noise codebook entry.

FIG. 7 shows three tables with exemplary bit allocations for signal encoding. According to one illustrative embodiment, shown in table 700, a 180 ms segment of speech may be encoded in 54 bits. The selected voicing codebook entry index is represented using 15 bits, while the selected speech codebook entry index (using the 3-stage speech codebook described above with respect to FIG. 2) is encoded using 39 bits (e.g. 13 bits for each stage-codebook entry). This results in a signal that is transmitted at 300 bits per second (bps). A similar encoding, shown in table 730, may be done using a 90 ms segment of speech, resulting in a signal that is transmitted at 600 bps. According to another embodiment, shown in table 760, a 90 ms segment of speech may be encoded in 90 bits, resulting in a signal that is transmitted at 1000 bps. This may be a more accurate encoding of the speech signal. In this embodiment, a 6-stage speech codebook is used, and 75 bits are used to encode the selected speech codebook entry index. The voicing codebook entry index is encoded using 15 bits. According to some embodiments, the voicing codebook entry index is encoded using 2, 5, 10, 25, 50, 75, 100, or 250 bits. According to other embodiments, the plurality of bits used to encode the speech codebook entry index includes 2, 5, 10, 20, 35, 50, 100, 250, 500, 1000, 2500, or 5000 bits.

According to one implementation, the signal may be encoded at a variable bit-rate. For example, a first segment may be encoded at 600 bps, as described above, and a second segment may be encoded at 300 bps, as described above. According to one configuration based on fixed duration segments composed of two frames, the encoding of each segment is determined as a function of the voicing properties of the frames. If it is determined that both frames of the segment are unvoiced and likely to be speech absent, a 2-bit code is transmitted together with a 13-bit speech codebook entry index. If it is determined that both frames are unvoiced and either frame is likely to have speech present, a different 2-bit code is transmitted together with a 39-bit speech codebook entry index. If at least one of the two frames is determined to be voiced, a 1-bit code is transmitted together with a 39-bit speech codebook entry index and a 14-bit voicing codebook entry index.

This encoding corresponds to one implementation of a variable-bit-rate vocoder which has been tested using 22.5 ms frames and yields an average bit rate of less than 969 bps. According to this implementation, about 20% of segments were classified as "unvoiced-unvoiced" and likely speech-absent, about 20% of segments were classified as "unvoiced-unvoiced" and likely speech-present, and about 60% of segments were classified as "voiced-unvoiced," "unvoiced-voiced," or "voiced-voiced." Using the bit rates described above, and calculating the average occurrence of each type of segment, this results in an average of 3+8.2+32.4=43.6 bits per 45 ms segment, or less than 969 bps.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

We claim:

1. A method comprising:
   providing a speech codebook including a plurality of speech codebook entries corresponding to speech sounds;
   providing an environmental noise codebook including a plurality of entries, wherein each entry corresponds to a different environmental noise sound;
   receiving an audio signal including environmental noise sounds;
   updating, in real-time, an entry in the environmental noise codebook based on the environmental noise sounds in the received audio signal;
   creating a plurality of templates for each of a plurality of entries in the speech codebook, wherein each template created for a given entry in the speech codebook is created as a function of the given speech codebook entry and a different environmental noise codebook entry; and
   identifying speech sounds in the audio signal using the speech codebook and the environmental noise codebook, wherein identifying a speech sound includes matching a segment of the audio signal to one of the plurality of created templates.

2. The method of claim 1, wherein creating the plurality of templates includes combining at least one speech codebook entry with at least one environmental noise codebook entry.

3. The method of claim 2, wherein the at least one speech codebook entry and the at least one environmental noise codebook entry are each characterized by a vector comprising a gain parameter and at least one line spectral frequency parameter.

4. The method of claim 3, wherein combining at least one speech codebook entry with at least one environmental noise codebook entry comprises transforming the vectors into autocorrelation parameter vectors and adding the autocorrelation parameter vectors.

5. The method of claim 1, further comprising terminating matching a segment of the audio signal to a template upon identification of an acceptable match.

6. The method of claim 1, further comprising digitally encoding pauses and the identified speech sounds for transmission.

7. The method of claim 6, wherein the identified speech sounds and pauses are encoded at a bit rate of less than 2500 bits per second.

8. The method of claim 6, wherein the identified speech sounds and the pauses are encoded at a variable bit rate.

9. The method of claim 8, wherein the bit rate for encoding one of an identified speech sound and a pause is a function of the characteristics of one of the identified speech sound and the pause.

10. The method of claim 1, further comprising providing a noisy speech codebook including at least one of the plurality of templates.

11. The method of claim 10, further comprising creating a template as a function of at least one speech codebook entry and at least one environmental noise codebook entry.

12. The method of claim 10, further comprising creating the plurality of templates as a function of the plurality of speech codebook entries and a first environmental noise codebook entry.

13. The method of claim 10, further comprising updating the noisy speech codebook based on a second plurality of templates created as a function of the plurality of speech codebook entries and a second environmental noise codebook entry.

14. The method of claim 10, further comprising creating the plurality of templates as a function of the plurality of speech codebook entries and the plurality of environmental noise codebook entries.

15. The method of claim 1, further comprising detecting the presence of speech in the audio signal.

16. The method of claim 15, further comprising generating the environmental noise codebook entries from segments of the audio signal absent of speech.

17. The method of claim 1, further comprising selecting an environmental noise codebook entry similar to a noise component of the audio signal.

18. The method of claim 1, further comprising temporally parsing the audio signal into segments.

19. The method of claim 18, further comprising detecting the presence of speech in a segment of the audio signal.

20. The method of claim 1, wherein a speech codebook entry and an environmental noise codebook entry respectively include characteristics of a speech sound and an environmental noise sound.

21. The method of claim 20, further comprising matching the characteristics of at least one of a speech codebook entry and an environmental noise codebook entry with characteristics of a segment of the audio signal.

22. The method of claim 20, wherein the characteristics include at least one of frequency, duration, amplitude, and gain characteristics.

23. The method of claim 20, wherein the characteristics include parameters describing a frequency versus amplitude spectrum corresponding to at least one of a speech sound and an environmental noise sound.

24. The method of claim 20, wherein the characteristics include parameters describing a frequency versus amplitude spectrum corresponding to a segment of the audio signal.

25. The method of claim 24, wherein the parameters include at least one of gain and predictor coefficients, gain and reflection coefficients, gain and line spectral frequencies, and autocorrelation coefficients.

26. The method of claim 1, wherein updating an entry in the environmental noise codebook includes adapting the entry based on a segment of the audio signal absent of speech.

27. The method of claim 1, wherein updating an entry in the environmental noise codebook includes replacing the entry with a new entry generated from a segment of the input audio signal absent of speech.

28. The method of claim 1, wherein the environmental noise codebook entry updated is the least frequently used environmental noise codebook entry.

29. The method of claim 1, wherein the environmental noise codebook entry updated is the least recently used environmental noise codebook entry.

30. The method of claim 1, wherein the environmental noise codebook entry updated is the least recently updated environmental noise codebook entry.

31. The method of claim 1, wherein the environmental noise codebook entry updated is the entry that is most similar to a new entry generated from a segment of the audio signal absent of speech.

32. The method of claim 1, wherein the adaptive environmental noise codebook includes at least 10 entries.

33. The method of claim 1, further comprising providing a voicing codebook including a plurality of voicing codebook entries.

34. The method of claim 33, wherein a voicing codebook entry corresponds to at least one voicing characteristic.

35. The method of claim 34, wherein the at least one voicing characteristic comprises at least one of presence of voicing, absence of voicing, pitch, and pitch trajectory.

36. The method of claim 33, wherein a voicing codebook entry represents at least one frame from an audio signal.

37. The method of claim 1, wherein the audio signal is temporally divided into frames.

38. The method of claim 37, wherein a frame has a predetermined duration.

39. The method of claim 38, wherein a frame has a variable duration.

40. The method of claim 18, wherein a segment comprises at least one of a frame, a plurality of sequential frames, and a plurality of overlapping frames.

41. A device comprising:
a receiver for receiving an audio signal including environmental noise sounds;
a first database for storing a plurality of speech codebook entries representative of a plurality of speech sounds;
a second database for storing a plurality of environmental noise codebook entries, wherein each entry corresponds to a different environmental noise sound;
a first processor for updating, in real-time, an entry in the environmental noise codebook based on environmental noise sounds in the audio signal;
a template processor for creating a plurality of templates for each of a plurality of entries in the speech codebook, wherein each template created for a given entry in the speech codebook is created as a function of the given speech codebook entry and a different environmental noise codebook entry;
a second processor for identifying speech sounds in the audio signal as a function of the speech codebook entries and the environmental noise codebook entries; and
a match processor for matching a segment of the audio signal with one of the plurality of created templates.

42. The device of claim 41, wherein the template processor creates a template by combining at least one speech codebook entry with at least one environmental noise codebook entry.

43. The device of claim 42, wherein the at least one speech codebook entry and the at least one environmental noise codebook entry each include a vector having a gain parameter and at least one line spectral frequency parameter.

44. The device of claim 43, wherein the second processor further includes a transform processor for transforming the speech codebook entry vector and the environmental noise codebook entry vector into autocorrelation parameter vectors and adding the autocorrelation parameter vectors.

45. The device of claim 41, further comprising a third processor for digitally encoding pauses and the identified speech sounds for transmission.

46. The device of claim 45, wherein the third processor includes an encoder that encodes the identified speech sounds and the pauses at a bit rate of less than 2500 bits per second.

47. The device of claim 45, wherein the third processor includes an encoder that encodes the identified speech sounds and the pauses at a variable bit rate.

48. The device of claim 47, wherein the third processor determines the bit rate for encoding one of an identified speech sound and a pause as a function of the characteristics of one of the identified speech sound and the pause.

49. The device of claim 41, further comprising third database for storing a noisy speech codebook including the plurality of templates.

50. The device of claim 41, wherein the template processor creates a template by combining at least one speech codebook entry with at least one environmental noise codebook entry.

51. The device of claim 49, wherein the template processor creates the plurality of templates as a function of the plurality of speech codebook entries and a first environmental noise codebook entry.

52. The device of claim 49, wherein the second processor includes a noisy speech codebook updater for updating the noisy speech codebook based on a second plurality of templates created as a function of the plurality of speech codebook entries and a second environmental noise codebook entry.

53. The device of claim 49, wherein the template processor creates the plurality of templates as a function of the plurality of speech codebook entries and the plurality of environmental noise codebook entries.

54. The device of claim 41, further comprising a fourth processor for detecting speech in a segment of the audio signal.

55. The device of claim 54, wherein the first processor generates environmental noise codebook entries from segments of the audio signal absent of speech.

56. The device of claim 41, wherein the second processor selects an environmental noise codebook entry as a function of a noise component of the audio signal.

57. The device of claim 41, further comprising a third processor for temporally parsing the audio signal into segments.

58. The device of claim 57, wherein the third processor detects the presence of speech in a segment of the audio signal.

59. The device of claim 41, wherein a speech codebook entry and an environmental noise codebook entry respectively include characteristics of a speech sound and an environmental noise sound.

60. The device of claim 59, further comprising a third processor for matching the characteristics of at least one of a speech codebook entry and an environmental noise codebook entry with characteristics of a segment of the audio signal.

61. The device of claim 59, wherein the characteristics include at least one of frequency, duration, amplitude, and gain characteristics.

62. The device of claim 59, wherein the characteristics include parameters describing a frequency versus amplitude spectrum corresponding to at least one of a speech sound and environmental noise sound.

63. The device of claim 59, wherein the characteristics include parameters describing a frequency versus amplitude spectrum corresponding to a segment of the audio signal.

64. The method of claim 63, wherein the parameters include at least one of gain and predictor coefficients, gain and reflection coefficients, gain and line spectral frequencies, and autocorrelation coefficients.

65. The device of claim 41, wherein the first processor updates an entry in the environmental noise codebook by adapting the entry based on a segment of the audio signal absent of speech.

66. The device of claim 41, wherein the first processor updates an entry in the environmental noise codebook by replacing the entry with a new entry generated from a segment of the audio signal absent of speech.

67. The device of claim 41, wherein the database for storing the environmental noise codebook includes at least 10 entries.

68. The device of claim 41, further comprising a third database for storing a voicing codebook including a plurality of voicing codebook entries.

69. The device of claim 68, wherein a voicing codebook entry corresponds to a least one voicing characteristic.

70. The device of claim 69, wherein the at least one voicing characteristic comprises at least one of presence of voicing, absence of voicing, pitch, and pitch trajectory.

71. The method of claim 1, wherein updating in real-time comprises continuously updating entries in the environmental noise codebook.

72. The method of claim 1, wherein updating in real-time comprises continuously updating entries in the environmental noise codebook while vocoding.

73. The method of claim 1, wherein updating in real-time comprises continuously updating entries in the environmental noise codebook while vocoding based on segments of the audio signal absent of speech.

74. The device of claim 41, wherein updating in real-time refers to continuously updating entries in the environmental noise codebook.

75. The device of claim 41, wherein updating in real-time comprises continuously updating entries in the environmental noise codebook while vocoding.

76. The device of claim 41, wherein updating in real-time comprises continuously updating entries in the environmental noise codebook while vocoding based on segments of the audio signal absent of speech.

* * * * *